US005668979A

United States Patent [19]

Lawless et al.

[11] Patent Number: 5,668,979

[45] Date of Patent: Sep. 16, 1997

[54] STORAGE OF CLIPPING PLANE DATA IN SUCCESSIVE BIT PLANES OF RESIDUAL FRAME BUFFER MEMORY

[75] Inventors: William Francis Lawless, Red Hook, N.Y.; Richard Jesse Mitchell, Austin, Tex.

[73] Assignee: International Business Machines Corporation, Armonk, N.Y.

[21] Appl. No.: 369,577

[22] Filed: Jan. 6, 1995

Related U.S. Application Data

[63] Continuation of Ser. No. 123,823, Sep. 20, 1993, abandoned.

[51] Int. Cl.$^6$ .............................. G06T 1/60

[52] U.S. Cl. .............................. 345/509; 345/517; 345/434; 345/189; 345/118

[58] Field of Search .............................. 345/133, 114, 345/115, 116, 155, 189, 118, 185, 186, 187; 395/118, 133, 134, 509, 510, 517

[56] References Cited

U.S. PATENT DOCUMENTS

| | | | |
|---|---|---|---|
| 4,646,078 | 2/1987 | Knierim et al. | 345/203 |
| 4,745,407 | 5/1988 | Costello | 345/155 |
| 4,829,295 | 5/1989 | Hiroyuki | 395/133 |
| 4,918,429 | 4/1990 | Clarke | 345/203 |
| 4,980,765 | 12/1990 | Kudo et al. | 345/203 |
| 4,987,551 | 1/1991 | Garrett | 345/113 |
| 5,007,001 | 4/1991 | Lloyd-Williams | 395/118 |
| 5,061,919 | 10/1991 | Watkins | 345/115 |
| 5,193,148 | 3/1993 | Alcorn et al. . | |
| 5,252,953 | 10/1993 | Sandrew et al. | 345/203 |

FOREIGN PATENT DOCUMENTS

| | | | |
|---|---|---|---|
| 0279228 | 8/1988 | European Pat. Off. | 345/189 |
| 2-81087 | 3/1990 | Japan . | |
| 2-81088 | 3/1990 | Japan . | |

OTHER PUBLICATIONS

IBM TDB, "Hardware Priority Windows without Window ID Planes", vol. 36, No. 04, Apr. 1993, pp. 521–522.

Tandy, "TRS–80 Color Computer Technical Reference Manual". Ft Worth. 1981. pp. 25–26.

*Primary Examiner*—Kee M. Tung
*Attorney, Agent, or Firm*—Casimer K. Salys

[57] ABSTRACT

A system and method for storing clipping, masking or stenciling plane data in an unused or residual portion of a frame buffer used with a graphics display. The clipping plane data corresponding to the pixels in the displayed portion of the frame buffer are effectively and efficiently stored through a folding type conversion of addresses. High speed address conversion for both rendering and accessing of clipping data is performed by hardware logic devices.

7 Claims, 5 Drawing Sheets

STORAGE OF CLIPPING PLANE DATA IN SUCCESSIVE BIT PLANES OF RESIDUAL FRAME BUFFER MEMORY

This is a continuation of application Ser. No. 08/123,823 filed Sep. 20, 1993 now abandoned.

BACKGROUND OF THE INVENTION

The present invention generally relates to the storage and retrieval of data during the computer generation of graphics images on a video display screen. More particularly, the invention is directed to a system and method for efficiently generating, storing and retrieving clipping, masking or stenciling plane data used in conjunction with video display images rendered into a frame buffer.

The rendering, storage and eventual display of graphics images defined by computer systems is an area of technology undergoing much competition and evolution. Presently preferred systems used to generate high resolution and color range graphics images, including those involving animation and video reproduction, use high speed raster engines to convert primitives defined by central processors into color images stored as binary data in a video frequency random access memory known as a frame buffer. The data in the frame buffer is stored in a raster format corresponding to the video display, with the depth of the frame buffer, defined by bit planes, corresponding to the color resolution. The frame buffer is scanned in synchronism with the video display screen to generate the final image. High performance work stations also typically include additional bit planes, corresponding in size to the frame buffer, for storing windows and other general masking or clipping applications. As the pixel resolution of high grade video displays increases, presently typically being 1024×768, so too does the size of the frame buffer. Unfortunately, frame buffers use expensive VRAM chips, a cost which is further magnified for systems using double buffering.

Configurations of VRAM chips normally create frame buffers having fixed addressable ranges incremented in powers of 2, while video display screens are not so proportioned. Therefore, unused or residual portions of frame buffer memory typically remain. In the context of the 1024×768 pixel count graphics display screen, the typical frame buffer is 1024×1024 in size. Therefore, the frame buffer contains an unused or residual addressable memory space of 1024×256.

The depth of the residual memory corresponds to the number of the bit planes in the used portion of the frame buffer. For a graphics display having a 256 color range, the frame buffer is composed of 8 bit planes. For graphics workstations in which high color resolution is important, 24 bits of data, 8 each of RGB, are used to represent each pixel in the frame buffer.

Given the high cost of the RAM memory used in frame buffers, there exists a need for a system and method which efficiently utilizes the residual memory of a frame buffer by storing clipping plane, masking plane or stencil plane data in the residual portion memory. Any such storage, must, however, provide for high speed and low hardware complexity rendering of the clipping planes into the residual memory, and later extract the clipping planes from the residual memory at a rate matching the rendering rate into the frame buffer. Though software managed techniques are available for storing data in the residual frame buffer memory, software managed methods do not provide adequate speed for extracting and using the clipping, masking and stencil data coincident with rendering of the screen images into the frame buffer.

SUMMARY OF THE INVENTION

The system and method of the present invention efficiently utilizes residual frame buffer memory to render, store and access clipping, masking, stenciling, windowing, overlay, underlay, and the like data, hereinafter generally referred to as clipping data, on a per pixel basis with minimum complexity and at a speed consistent with the rendering rate of the graphics display system. In general, clipping data corresponding by pixel to the screen image rendered into the frame buffer is stored in a succession of bit planes within the residual memory of the frame buffer. The relative size of the residual frame buffer memory to the full frame buffer memory defines the number of bit planes needed for storing the clipping planes.

In one form, the invention relates to a clipping plane storage system using residual address space in a multiple bit plane frame buffer, which comprises a means for partitioning displayed frame buffer address space into two or more portions, means for relating address space in the two or more portions to the residual address space in the frame buffer, and means for locating clipping plane data by frame buffer portions in respective bit planes of the residual address space. In another form, the invention relates to a graphics system using a frame buffer having residual address space, for clipping plane storage system in the residual address space, comprising a multiple bit plane frame buffer, means for relating the residual address space to portions within the frame buffer address space subject to being displayed, and means for relating the clipping plane data in successive bit planes to portions within the frame buffer address space subject to being displayed. In a further form, the invention relates to a method for storing clipping plane data in residual address space of a multiple bit plane frame buffer consistent with the structure noted hereinbefore.

The invention as preferably embodied involves a multiple bit plane frame buffer which is larger in size than the video display which it supports. The unused or residual memory of the frame buffer is used to store clipping plane data in an arrangement which divides the displayed section of the frame buffer into portions, and folds or stacks the corresponding clipping plane data into the residual section of the frame buffer by relating frame buffer bit planes to the aforementioned portions of the addressed frame buffer. Rendering of the clipping data into the residual portion of the frame buffer is readily accomplished using frame buffer plane masking. Clipping data is applied to rendered images in relatively conventional manner. The address shifting needed to align clipping data by pixels to corresponding displayed frame buffer portion pixels is accomplished with relatively few comparison and addition circuits. Thereby, expensive VRAM frame buffer memory is efficiently utilized while maintaining system speed and without unduly complicating the rendering into the display portion of the frame buffer.

These and other features of the invention will be more clearly understood and appreciated upon considering the detailed description which follows hereinafter.

DESCRIPTION OF THE PREFERRED EMBODIMENT

Figure 1:
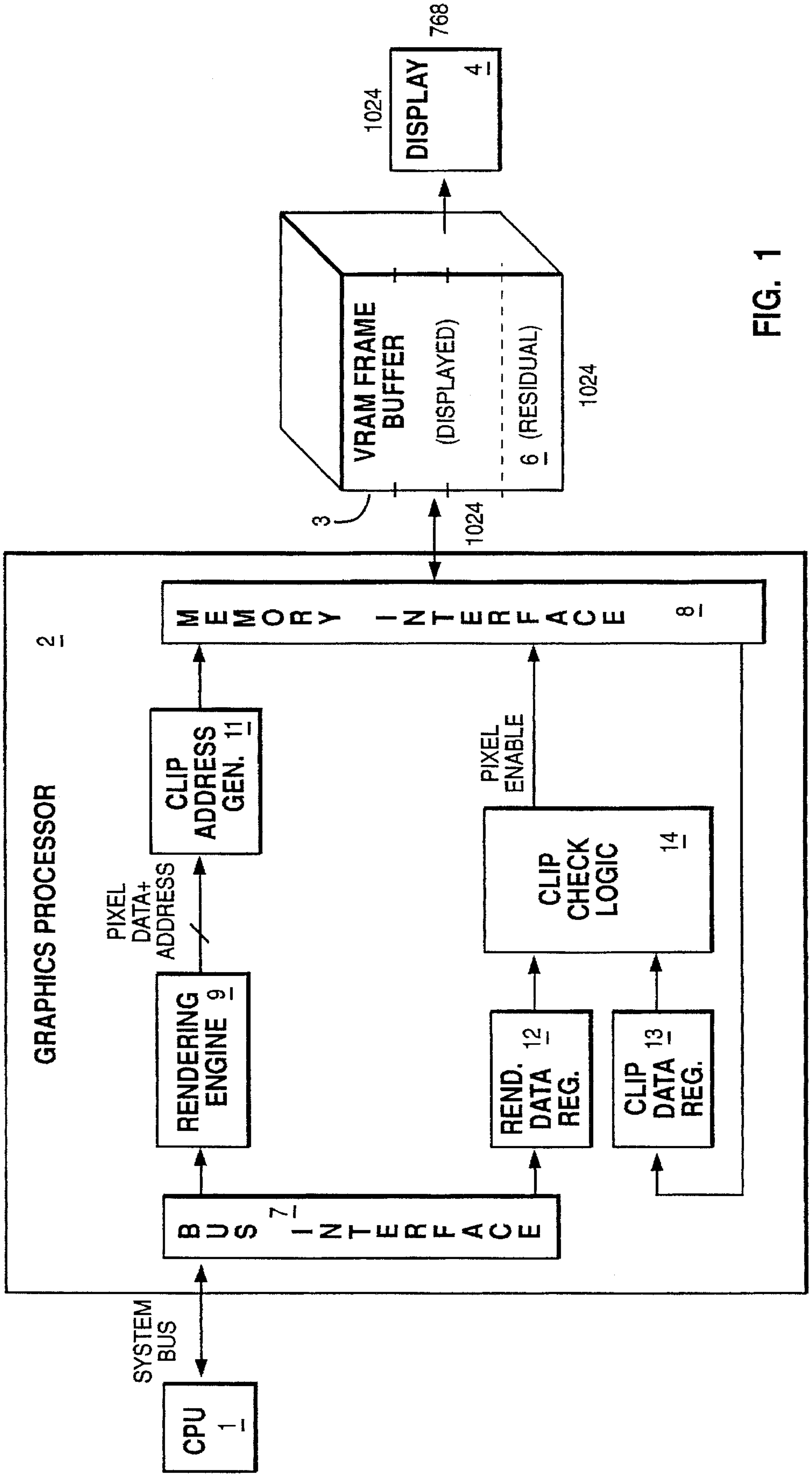
FIG. 1 is a schematic block diagram of a composite graphics system.

FIG. 1 illustrates by blocked diagram the key elements within the context of which the present invention is practiced. These include central processing unit 1, which defines the graphics primitives to be generated, graphics processor 2, used to render the individual pixels which make up the graphics image, frame buffer memory 3, storing the image to be displayed, and display 4, depicting the image in a form perceivable by a human user. The rasterization means used to convert multiple bit planes of data stored in the frame buffer into color images on the display is omitted in that it is well known and therefore does not contribute meaningfully to the understanding of the invention. Note that display 4 is not square in pixel distribution, but, rather, represents a conventional rectangular graphic display screen of 1024×768 pixels. Frame buffer 3 uses conventional VRAM type memory devices and consequently needs an x-y direction address space of 1024×1024 to support 1024×768 display 4.

Moderately priced graphics systems will typically have frame buffers with 8 bit planes, providing 8 bit bits per pixel position color resolution. It should be understood that the frame buffer can have greater or fewer bit planes, with fewer providing relatively meager color resolution while larger numbers, typically 24, provide near ideal color resolution. In like manner, the architecture of the overall system can use multiple frame buffers when the need arises, allowing one to be modified as the other is being scanned for display.

The invention focuses on the effective and efficient utilization of the unused or residual portion 6 of frame buffer 3 to store data which can be used for clipping, masking or stenciling purposes during the rendering of the images into the displayed portion of the frame buffer. Clearly, as is done in most expensive systems, additional bit planes could be added to the frame buffer to store this data. However, these additional planes are relatively expensive VRAM memory, a part of which again is unused or residual. Therefore, the basic structure and organization of the frame buffer remains unchanged.

The graphics processor as detailed at 2 in FIG. 1 is relatively conventional in organization and operation. Graphics processor 2 is shown to include bus interface 7 at one side and frame buffer memory interface 8 at the opposite side. Rendering engine 9 remains relatively normal, but is connected through clip address generator 11 to memory interface 8. In the present embodiment, clip address generator 11 provides the address conversion needed to properly locate the clipping plane data portion 6 of frame buffer 3.

Graphics processor 2 also includes rendering data register 12, clipping data register 13, and clip compare logic 14, which together function in relatively conventional manner to mask or clip newly generated pixel data based upon the state of the corresponding pixel within the mask stored in residual portion 6 of frame buffer 3. The invention focuses on the effective use of this fundamental architecture to render, store and use clipping data.

Figure 2:
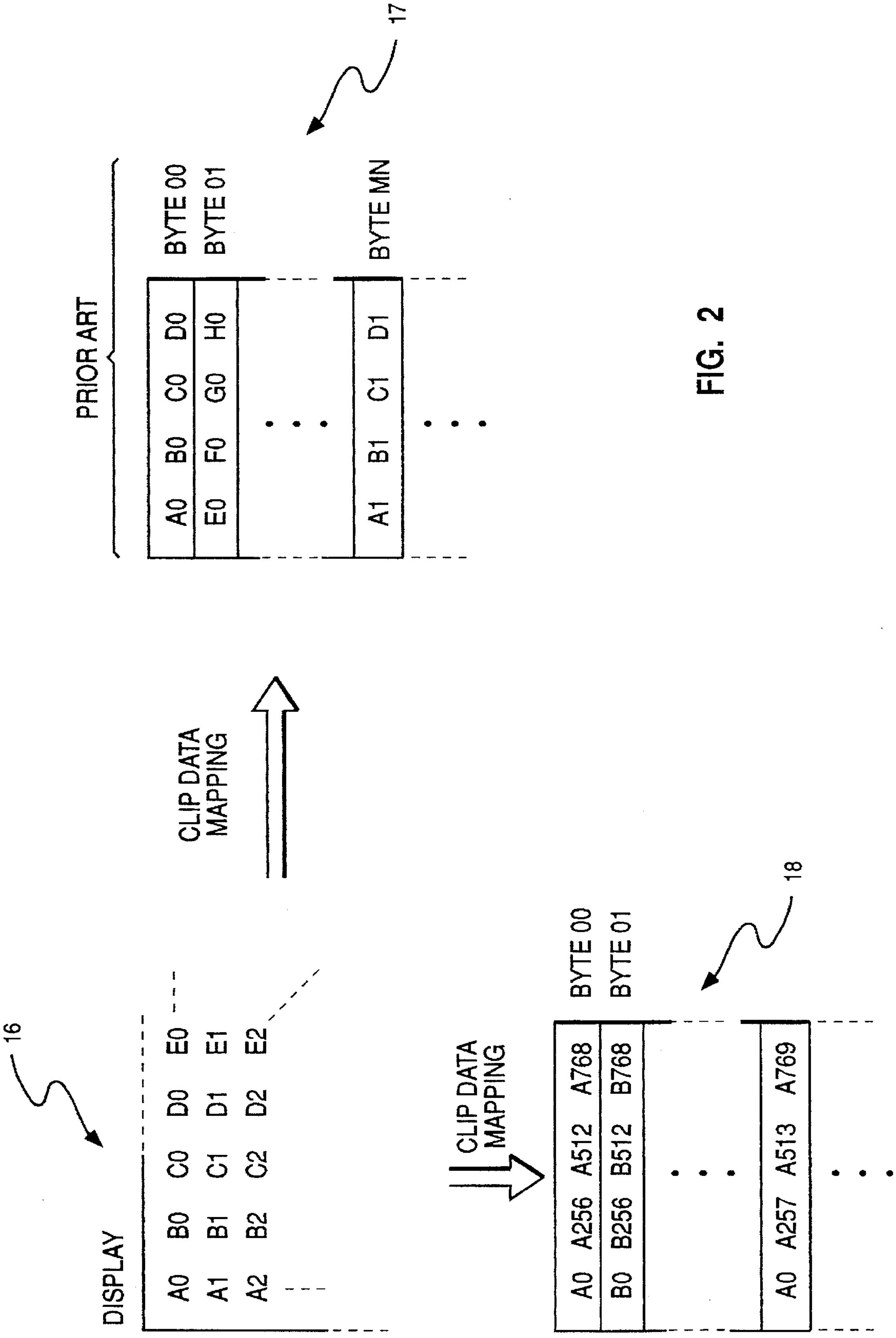
FIG. 2 is a schematic comparison of clipping data mapping as accomplished according to the prior art and according to the present invention.

FIG. 2 depicts and contrasts the storage of clipping data in the residual portion of the frame buffer as practiced through software manipulation in the prior art and as presently disclosed. Display referenced pixel positions are shown generally at 16, extending in a X-Y format across the screen. Storage of clipping data in unused or residual portions of the frame buffer according to the prior art is shown generally at 17, where the clip data for pixel positions AO, BO, CO and DO, are stacked in the successive 8 bit planes of each residual frame buffer address. Data for successive positions is then stacked in the planes of successive frame buffer addresses. As a consequence of the complexity, the conversion of the clipping data addresses was slow, usually requiring software manipulation of the address information.

In contrast to the practice of the prior art, the present system and method of storing clipping data creates the arrangement depicted generally at 18. A conceptual depiction of the address conversion this folded type storage of clipping data appears in FIG. 3, the figure further depicts the earlier shown use of 1024×1024 pixel by 8 bit plane frame buffer 3 in association with a 1024×768 display. In this context, the residual memory is composed of 8 bit planes 1024 by 256 dimension. As embodied, the clipping data is stored in the first 6 bit planes of residual frame buffer memory 6. The address conversion is accomplished in the manner conceptually depicted in FIG. 3. The displayed part of the frame buffer is divided into three portions, consistent with the 256 size of the residual memory. Two planes of clipping data 19, which are related to the pixels in upper portion 21 of frame buffer 3, are stored in the first two planes of residual frame buffer memory 6. The successive two planes of clipping data 22, which are associated with the pixels in portion 24 of the frame buffer, define the next two planes in the residual portion of the frame buffer. A similar address conversion relationship is established between the two planes of clipping data 26 and portion 27 of the pixel related frame buffer. As embodied, the last two planes of residual frame buffer 6 are unused.

Figure 4:
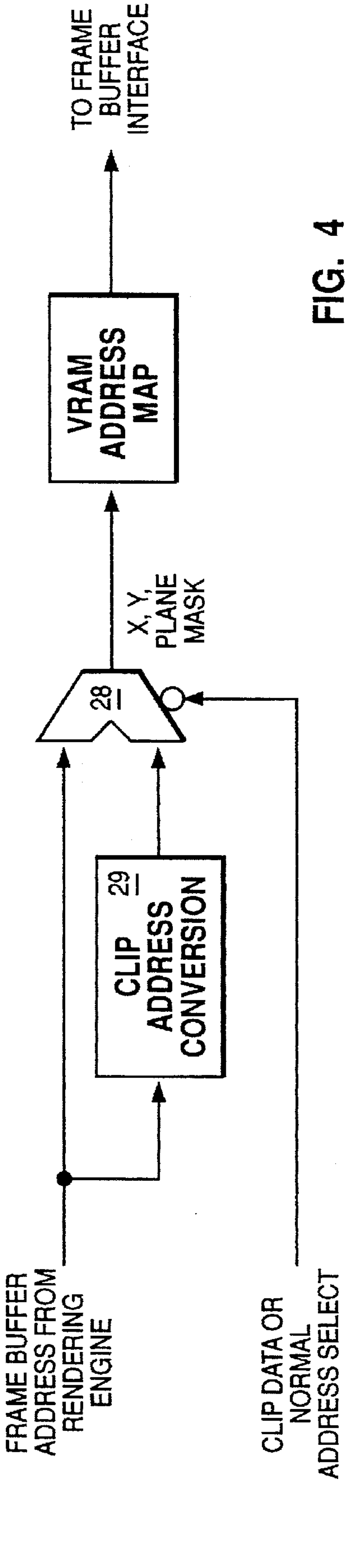
FIG. 4 is a schematic of circuitry used to render clipping data addresses.

The benefits of the invention are attributable in part to the ease and therefore the speed with which conversion can be accomplished, the conversion being accomplished as an aspect of the rendering process. FIG. 4 schematically illustrates the operations which are performed within clip address generator 11 (FIG. 1). The rendering engine provides x-y pixel data and plane masked data. In the absence of clipping, the normal address mode is selected and the addresses pass through gate 28 to the conventional VRAM address map. On the other hand, if clipping data is being rendered into or read from the residual portion of the frame buffer, gate 28 is switched so that the converted address output from clip address conversion blocked 29 is provided to the VRAM address map circuitry.

During the rendering of clipping plane data into planes such as 19, 22 or 26 (FIG. 3) of residual frame buffer portion 6, there is a need to designate by conversion not only the frame buffer X-Y address, but also the frame buffer plane or planes to which the clipping data is to be directed. This is accomplished in the manner illustrated by the example of FIG. 5. In the example, the objective is to render clipping data corresponding to bit combination "11" into a selected pair of bit planes for a specified pixel position. This is accomplished by making all the bits "11" combinations, writing to the selected pixel position in residual frame buffer 6, and enabling the plane mask to inhibit writing into nonselected planes of the frame buffer pixel position so written.

Figure 5:
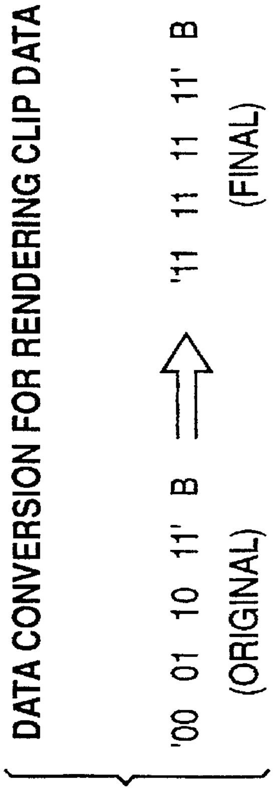
FIG. 5 illustrates by example the conversion of clip data during rendering.
Figure 6:
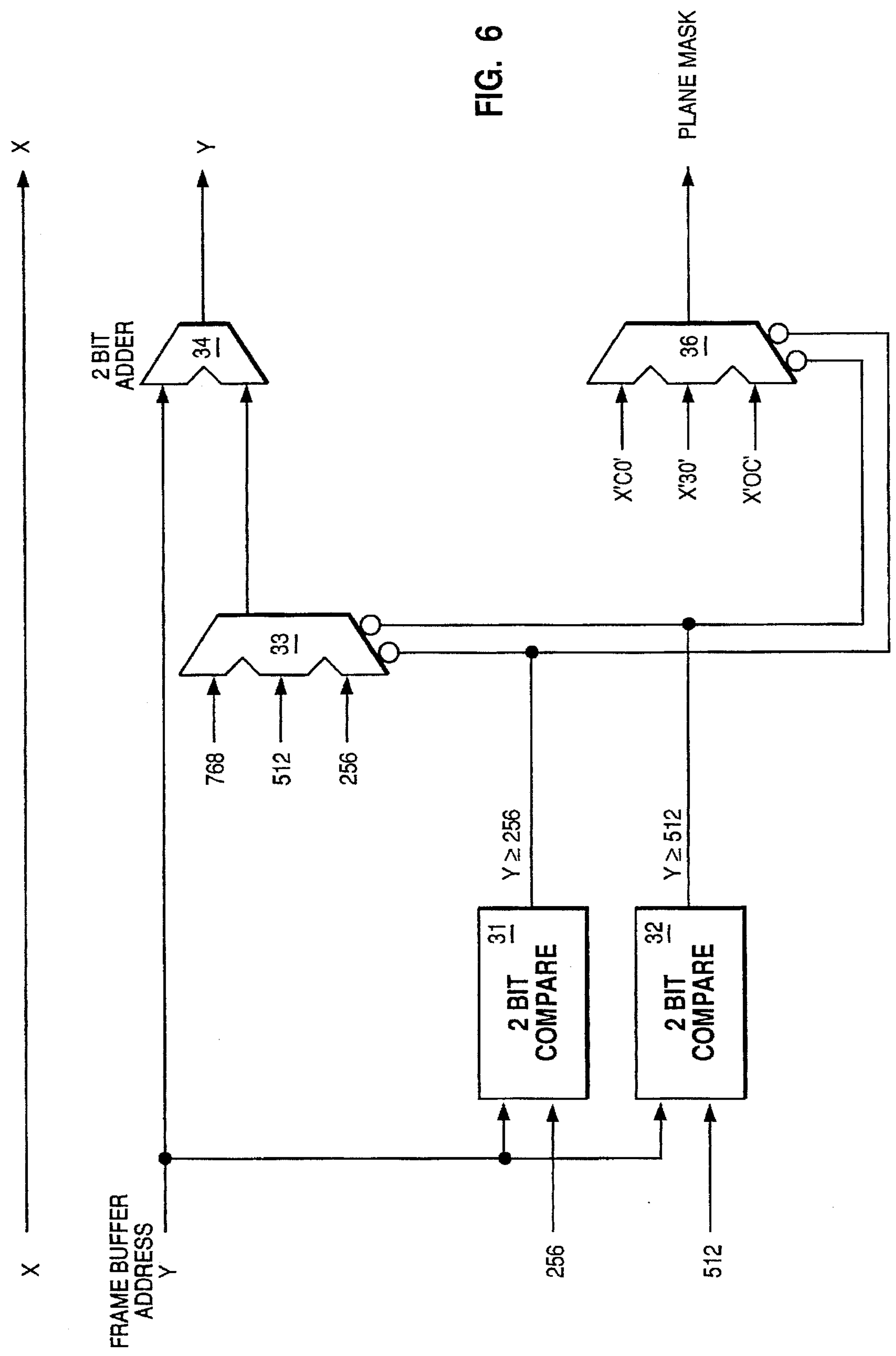
FIG. 6 is a schematic depicting circuitry for translating displayed frame buffer addresses to residual frame buffer addresses.

FIG. 6 provides a schematic of devices suitable to accomplish the clipping address conversion described with reference to FIG. 4, and the plane masking described with reference to FIG. 5. Note that the X direction address is not converted. In converting the Y direction address, 2 bit comparators 31 and 32 determine whether the pixel being addressed is situated within portions 21, 24 or 27 (FIG. 3) of the frame buffer. Depending on the outcome, gate 33 increments the frame buffer Y address to position the data within the appropriate relative pixel position as exists within residual frame buffer memory 6. Two bit adder 34 accomplishes this operation by incrementing the most significate bits of the Y address.

The frame buffer bit plane masking information is generated in gate 36, and is likewise responsive to the outputs of comparators 31 and 32. During the rendering of clipping data into the residual portion of the frame buffer, gate 36 determines which of the frame buffer planes is to be masked in direct correspondence to the portion of the frame buffer to which the clipping data pertains.

It is important and noteworthy that the clipping plane storage system and method of the present invention utilizes residual frame buffer memory so that address translation can be accomplished with high speed hardware for both the storing and the reading of the clipping plane data.

Figure 3:
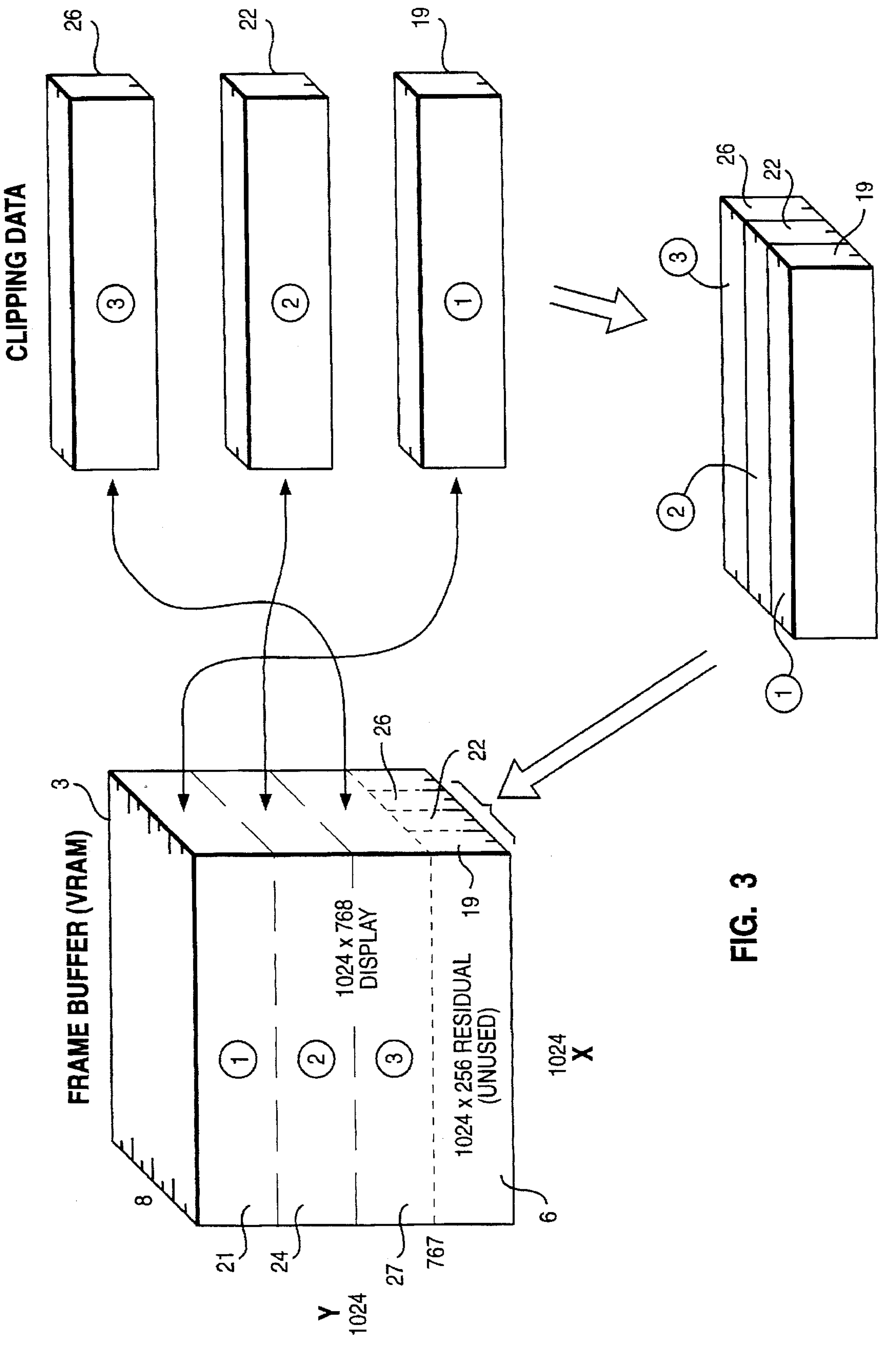
FIG. 3 is a schematic diagram depicting how the clipping data is related and stored in the frame buffer.

A double buffered frame buffer system doubles the number of the planes available for storing clipping data. For example, a double buffer version of frame buffer 3 as depicted in FIG. 3 would provide 16 bit planes for clipping data. The preferred implementation for such a system involves the use of 4 clip planes folded into the first 12 of the 16 bit planes within the residual portion of the frame buffer. Though from a data storage perspective the 16 bit planes in the residual portion of the frame buffer have adequate memory to hold 5 clipping planes, the address translation associated with using the 5th plane would unacceptably reduce the conversion speed. It is undoubtedly apparent that as the relative proportions of the residual memory address space to the displayed address space change, so too will the number of frame buffer bit planes needed to store the clipping data. Namely, if the relative size of the residual portion of the frame buffer decreases, the number of planes needed to store clipping data will increase. It should also be recognized that since clipping plane data is accessed in the manner of the present invention through Y address changes, memory accesses are forced out of the page mode with associated performance effects.

Note that for high pixel and color resolution graphic systems having screen aspect ratios similar to that described in the embodiment, tremendous clipping data storage resources become available in the 24 bit planes often used for RGB data storage. Namely, for the same aspect ratio display, a 24 bit plane graphics display system provides storage capability for 8 clipping, masking or stenciling patterns.

Although the invention has been described and illustrated by way of a specific embodiment, the systems and methods encompassed by the invention should be interpreted consistent with the breadth of the claim set forth hereinafter.

We claim:

1. A clipping plane storage system using residual address space, the space not used for directly storing displayed data, in a multiple bit plane frame buffer, comprising:

the multiple bit frame buffer organized in an X-Y format, with equal X and Y direction address space, providing data storage at displayable and residual address space;

means for driving display organized in an X-Y format, with unequal X and Y direction address space, connected to receive data from address space in the frame buffer;

means for dividing the Y direction address space of the X-Y organized displayable frame buffer address space into two or more portions;

means for translating clipping plane data Y direction addresses in the divided two or more portions directly into Y direction addresses situated within the residual address space of the frame buffer; and means for storing clipping plane data, related by X-Y addresses to successive frame buffer Y direction portions, in successive bit planes of the residual address space responsive to translated clipping plane data Y direction addresses.

2. The system recited in claim 1, wherein the means for storing clipping plane data relates portions to bit planes.

3. The system recited in claim 2, wherein the means for storing clipping plane data further comprises means for selectively masking bit planes in the residual address space.

4. In a graphics system using a memory array having residual address space, that space not used for storing directly displayed data, a clipping plane storage system using the residual address space, comprising:

means for driving a display organized in an X-Y format, with unequal X and Y direction address space;

a multiple bit plane frame buffer addressable in an X-Y format, with equal X and Y direction address space to provide displayable and residual address space along the Y direction;

means for translating clipping plane data Y direction addresses in the residual address space directly into Y direction situated within the frame buffer address space subject to being displayed; and means for storing successive portions of clipping plane data in successive bit planes of the residual address space in the frame buffer responsive to translated clipping plane data Y direction addresses.

5. The system recited in claim 4, wherein the means for translating Y direction addresses shifts the Y address space in an amount correspond to a portion from a Y address in displayable address space to a Y address in the residual address space.

6. A method for storing clipping plane data in residual address space, that space not used for storing directly displayed data, of a multiple bit plane frame buffer configured in an X-Y format, with equal X and Y direction address space, as used to provide display data to an X-Y format display having unequal X and Y direction address space, comprising the steps of:

dividing the Y direction addresses of an X-Y organized displayable frame buffer address space into two or more portions;

translating clipping plane data Y direction addresses in the two or more portions directly into Y direction addresses situated within the residual address space of the frame buffer; and storing clipping plane data related by X-Y address to successive frame buffer Y direction portions in successive bit planes of the residual address space responsive to translated clipping plane data Y direction addresses.

7. The method recited in claim 6, wherein the step of storing clipping plane data relates portions to bit planes.

* * * * *